US011745660B2

(12) United States Patent
Guerrero et al.

(10) Patent No.: US 11,745,660 B2
(45) Date of Patent: Sep. 5, 2023

(54) SYSTEM FOR DETERMINING THE ANGULAR POSITION OF A TRAILER

(71) Applicant: Continental Autonomous Mobility Germany GmbH, Ingolstadt (DE)

(72) Inventors: David Guerrero, Toulouse (FR); Boris Lugez, Toulouse (FR)

(73) Assignee: Continental Autonomous Mobility Germany GmbH

(*) Notice: Subject to any disclaimer, the term of this patent is extended or adjusted under 35 U.S.C. 154(b) by 0 days.

(21) Appl. No.: 17/794,015

(22) PCT Filed: Dec. 30, 2020

(86) PCT No.: PCT/EP2020/088022
§ 371 (c)(1),
(2) Date: Jul. 20, 2022

(87) PCT Pub. No.: WO2021/148231
PCT Pub. Date: Jul. 29, 2021

(65) Prior Publication Data
US 2023/0082979 A1 Mar. 16, 2023

(30) Foreign Application Priority Data
Jan. 21, 2020 (FR) ...................................... 2000560

(51) Int. Cl.
*B60R 1/00* (2022.01)
*G06T 7/73* (2017.01)
(Continued)

(52) U.S. Cl.
CPC ................ *B60R 1/003* (2013.01); *B60R 1/22* (2022.01); *G06T 7/73* (2017.01); *G06V 20/46* (2022.01);
(Continued)

(58) Field of Classification Search
CPC .. B60R 1/003; B60R 1/22; B60R 1/00; B60R 2300/70; B60R 2300/80; B60R 2300/802;
(Continued)

(56) References Cited

U.S. PATENT DOCUMENTS 9,506,774 B2* 11/2016 Shutko .................. B60W 30/06
11,125,881 B2* 9/2021 Chen ..................... G01S 17/931
(Continued)

FOREIGN PATENT DOCUMENTS

GB 2505666 A 3/2014
WO 2009027090 3/2009

OTHER PUBLICATIONS

De Saxe, "Vision-based Trailer Pose Estimation for Articulated Vehicles", Doctoral Thesis, Sep. 2017, 261 pages, Dept.of Engineering, University of Cambridge.
(Continued)

*Primary Examiner* — Nathnael Aynalem
(74) *Attorney, Agent, or Firm* — RatnerPrestia

(57) ABSTRACT

A system for determining at least one pitch angle of a trailer relative to a towing vehicle, the system including a camera mounted on the towing vehicle and capable of acquiring images of the trailer in which lines of the trailer parallel to the axis of the trailer are visible, and a computer configured to perform the following steps: implementing a line-detection algorithm on at least one image of the trailer acquired by the camera, detecting in the image the lines of the trailer parallel to the trailer axis, corresponding to vanishing lines, and deducing from the vanishing lines a position of the vanishing point, and from the coordinates of the vanishing point, determining at least one pitch angle of the trailer with respect to the towing vehicle.

8 Claims, 3 Drawing Sheets

(51) Int. Cl.
*B60R 1/22* (2022.01)
*G06V 20/40* (2022.01)
*G06V 20/56* (2022.01)

(52) U.S. Cl.
CPC .... *G06V 20/56* (2022.01); *G06T 2207/30252* (2013.01)

(58) Field of Classification Search
CPC ... B60R 11/04; B60R 2001/1215; G06T 7/73; G06T 2207/30252; G06V 20/46; G06V 20/56; B62D 13/025; B60K 2370/176; B60K 2370/1868; B60K 2370/21; B60K 2370/52; B60K 2370/797; B60K 35/00; B60K 2370/152; B60K 2370/1526; B60K 2370/1529; B60K 2370/1531; B60K 2370/1533; B60K 2370/736; B60K 2370/739; B60K 2370/149; B60K 2370/194; H04N 7/181; G02B 27/01; G02B 27/0093; G05B 2219/35503; G06F 3/012; G06F 3/013
USPC .......................................................... 348/148
See application file for complete search history.

(56) References Cited

U.S. PATENT DOCUMENTS

| | | | |
|---|---|---|---|
| 2017/0280091 A1* | 9/2017 | Greenwood | H04N 7/181 |
| 2018/0186290 A1* | 7/2018 | Ward | B60R 1/00 |
| 2020/0143174 A1* | 5/2020 | Luo | B60D 1/62 |

OTHER PUBLICATIONS

Canny, J., "A Computational Approach to Edge Detection", IEEE Trans. Pattern Anal. and Mach. Intell., vol. PAMI-8, No. 6, pp. 679-698, Nov. 1986.
Tsai, F., et al., "Detection of Vanishing Points Using Hough Transform for Single View 3D Reconstruction", 34th Asian Conference on Remote Sensing 2013: ACRS Oct. 2013, 9 pages.
International Search Report and Written Opinion for International Application No. PCT/EP2020/088022, dated Mar. 29, 2021, with partial translation, 8 pages.
International Search Report and Written Opinion for International Application No. PCT/EP2020/088022, dated Mar. 29, 2021, 13 pages (French).
English Translation of the Written Opinion for International Application No. PCT/EP2020/088022, dated Mar. 29, 2021, 5 pages.

* cited by examiner

SYSTEM FOR DETERMINING THE ANGULAR POSITION OF A TRAILER

CROSS REFERENCE TO RELATED APPLICATIONS

This application is the U.S. National Phase Application of PCT International Application No. PCT/EP2020/088022, filed Dec. 30, 2020, which claims priority to French Patent Application No. 2000560, filed Jan. 21, 2020, the contents of such applications being incorporated by reference herein.

FIELD OF THE INVENTION

The present application relates to a system for determining at least one pitch angle of a trailer relative to a towing vehicle, and an associated method.

BACKGROUND OF THE INVENTION

A number of technologies are currently being developed to help drivers drive vehicles, for example by providing them with additional information on the configuration of the vehicle and its position in relation to its environment. These technologies are also required in the context of fully autonomous vehicles. This is the case for personal vehicles, but also for transport vehicles, typically comprising a towing vehicle and a trailer.

For assistance in driving such vehicles, and in particular for maneuvers aimed at parking the vehicle, it is important to know precisely the angular position of the trailer relative to the towing vehicle, and in particular the yaw, pitch, or even roll, depending on the inclination of the road.

There already exist solutions for determining the yaw angle of a trailer relative to a vehicle, based on analyzing an image acquired by a camera located in front of the trailer, Known, for example, is the doctoral thesis by Christopher Charles de Saxe "Visio-based trailer pose estimation for articulated vehicles", https://doi.org/10.17863/CAM.14370, 2017, incorporated herein by reference. The solution proposed therein is based on detecting and analyzing the position of the front face of the trailer, considered as a plane perpendicular to the optical axis of the camera. However, this assumption is restrictive and does not apply to a large number of trailers, such as trailers transporting tanks or wood or horse trailers, for example.

In addition, this method requires a calibration phase in which the vehicle must drive forward in a straight line over a certain distance, in order to determine a reference position of the front face of the trailer, from which relative values for the yaw angle of the trailer will be determined. As a result, the conditions for implementing the method are limited; for example, it cannot be implemented when starting the vehicle.

SUMMARY OF THE INVENTION

An aspect of the invention improves the situation by proposing a system for determining at least one pitch angle and, in one embodiment, a pitch angle and a yaw angle of a trailer relative to a towing vehicle.

In particular, a system for determining at least one pitch angle of a trailer relative to a towing vehicle to which the trailer is attached is proposed, the system comprising a camera mounted on the towing vehicle and capable of acquiring images of the trailer in which lines of the trailer parallel to the axis of the trailer are visible, and a computer, in which the computer is configured to implement the following steps:

implementing a line-detection algorithm on at least one image of the trailer acquired by the camera,
detecting in the image the lines of the trailer parallel to the trailer axis, corresponding to vanishing lines, and deducing from the vanishing lines a position of the vanishing point at the convergence of the vanishing lines, and
from the position of the vanishing point, determining at least one pitch angle of the trailer relative to the towing vehicle.

Advantageously, but optionally, the system according to an aspect of the invention further comprises at least one of the following features.

In one embodiment:
a first reference frame is associated with the trailer, centered on the anchor point of the trailer to the towing vehicle, the reference frame comprising two first axes perpendicular to the direction of the trailer and a third axis parallel to the direction of the trailer and extending theretoward,
a second reference frame is associated with the towing vehicle, centered on the camera,
a third reference frame is a two-dimensional reference frame of the image acquired by the camera, centered on the optical center of the camera, and
the coordinates of the vanishing point V of the trailer in the reference frame associated with the trailer are $(0, 0, Z\infty)$, and in the third reference frame are $(v_i, v_j)$,
and the computer is configured to determine the pitch angle $\beta$ of the trailer relative to the towing vehicle from the vertical coordinate $v_j$ of the vanishing point of the trailer in the reference frame of the image by:

$$\beta = \mathrm{atan}(-v_j).$$

In one embodiment, the computer is further configured to determine the yaw angle $\alpha$ of the trailer relative to the towing vehicle from a horizontal coordinate $v_i$ of the vanishing point of the trailer in the reference frame of the image by:

$$\alpha = \mathrm{atan}(v_i \cos \beta)$$

In one embodiment, the camera is further capable of acquiring images of the trailer in which vertical lines of the trailer are visible, and wherein the computer is further configured to determine a roll axis of the trailer relative to the towing vehicle from:
yaw and pitch angles of the trailer, and
the position in the reference frame of an image taken by the camera of a vanishing point W where the vanishing lines corresponding to the vertical lines of the trailer converge.

In one embodiment, the coordinates of the vanishing point W of the trailer in the reference frame associated with the trailer are $(X\infty, 0, 0)$, and in the reference frame of an image taken by the camera are $(w_i, w_j)$, and the computer is configured to calculate the roll angle $\theta$ from the horizontal coordinate $w_i$ of the vanishing point W by:

$$\theta = \mathrm{atan}\left(\frac{\cos\alpha + w_i \sin\alpha\cos\beta}{w_j \sin\beta}\right),$$

Another aspect of the present invention is a method for determining at least one pitch angle of a trailer relative to a towing vehicle to which the trailer is attached, the method being implemented by a system comprising a camera and a computer and comprising:

the camera acquiring an image of the trailer in which lines of the trailer parallel to the axis of the trailer are visible, implementing a line-detection algorithm to detect the lines of the trailer parallel the axis of the trailer, corresponding to vanishing lines of the image, deducing a position of the vanishing point of the trailer at the convergence of the vanishing lines, and from the coordinates of the vanishing point, determining at least one pitch angle of the trailer with respect to the towing vehicle.

In one embodiment, the method further comprises determining from the pitch angle and the coordinates of the vanishing point, a yaw angle of the trailer relative to the towing vehicle.

Another aspect of the present invention is a computer program product, comprising code instructions for implementing the method comprising the steps of:

implementing a line-detection algorithm on an image of a trailer in which lines of the trailer parallel to the main axis of the trailer are visible, selecting the vanishing lines of the image and deducing a position of the vanishing point of the trailer from the vanishing lines, and from the coordinates of the vanishing point, determining at least one pitch angle of the trailer with respect to the towing vehicle, when it is executed by a computer.

Another aspect of the invention is a method for determining at least one yaw angle of a trailer.

The proposed aspect of the invention makes it possible to determine the pitch angle, and also the yaw and roll angle of a trailer relative to a towing vehicle with fewer constraints on the geometry of the trailer than in the prior art, since all that is needed is for lines parallel to the axis of the trailer to be visible in an image acquired from the camera mounted on the towing vehicle. Such lines are typically the edges of a chassis of the trailer.

Furthermore, an aspect of the invention does not require calibration involving driving the towing vehicle and its trailer in a straight line, the pitch and yaw angle of the trailer being able to be determined from the start.

BRIEF DESCRIPTION OF THE DRAWINGS

Other features, details, aspects, and advantages will become apparent from reading the following detailed description and from analyzing the appended drawings, in which.

DESCRIPTION OF THE EMBODIMENTS

Figure 1:
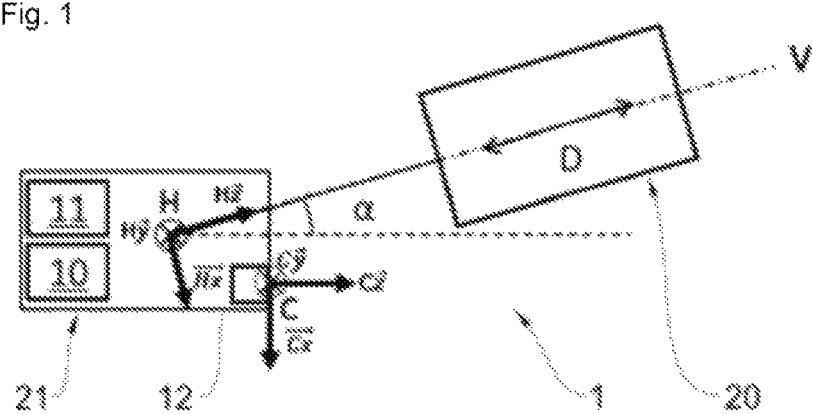
FIG. 1 shows a system according to one embodiment of the invention and illustrates the reference frames linked to the trailer and to the towing vehicle, respectively.

Reference is now made to FIG. 1, which schematically shows a system 1 for determining at least one pitch angle of a trailer 20 relative to a towing vehicle 21 to which the trailer is attached. The system 1 comprises a computer 10 and a memory 11 comprising code instructions for executing the method described below when they are executed by the computer 10. The computer 10 may be a processor, microprocessor, controller, microcontroller, FPGA, or other.

Figure 3:
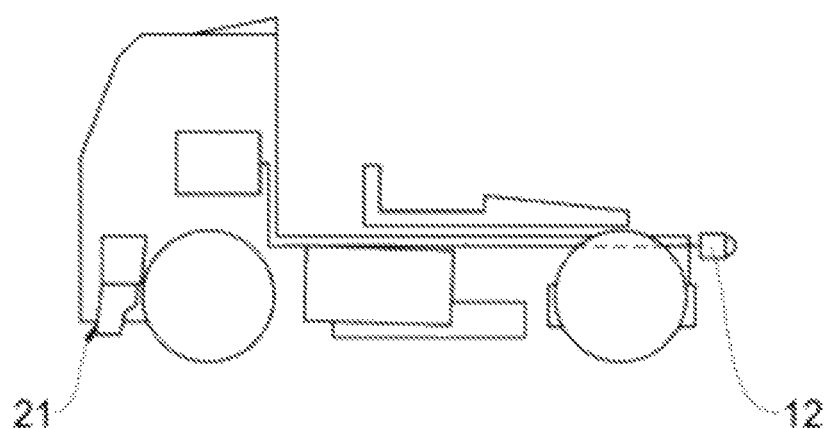
FIG. 3 shows an exemplary installation of a camera on a towing vehicle in order to implement the method for determining at least one angle of a trailer attached to the towing vehicle.

The system 1 further comprises a camera 12 mounted on the towing vehicle and capable of acquiring images of the trailer in which lines parallel to the axis D of the trailer are visible. In this respect, the camera 12 is advantageously positioned at the rear of the towing vehicle, being directed rearward from the towing vehicle with an optical axis substantially parallel to the axis of the towing vehicle, as illustrated in FIG. 3 for example. When the vehicle composed of the towing vehicle and the trailer travels in a straight line, the axis of the camera is also parallel to the direction of travel of the vehicle and the direction of the trailer. As a variant, the optical axis may form an angle with the axis of the towing vehicle, and in this case the camera may be calibrated to take account of this constant angle.

Figure 2:
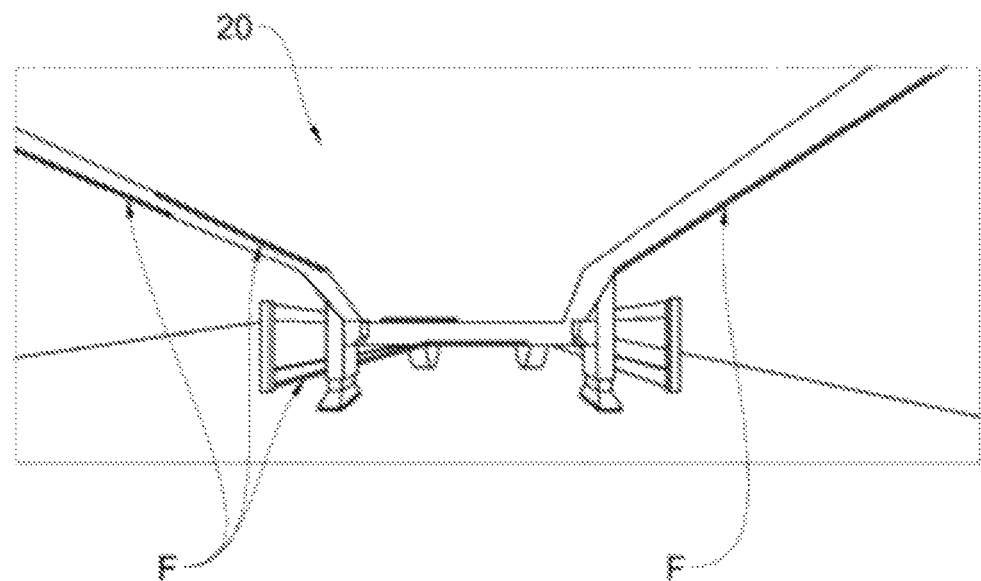
FIG. 2 shows an example of an image acquired by a camera in which parallel lines of a trailer appear.

In one embodiment, the lines parallel to the axis of the trailer which must appear in an image taken by the camera are lines of the chassis of the trailer, these lines being visible in the example shown in FIG. 2. To achieve this, the camera may be positioned at a height from the ground that is lower than the height of the chassis of the trailer.

Depending on trailer geometry, the position of the camera and its optics may be adjusted to ensure that images acquired by the camera show lines parallel to the axis of the trailer.

Figure 4:
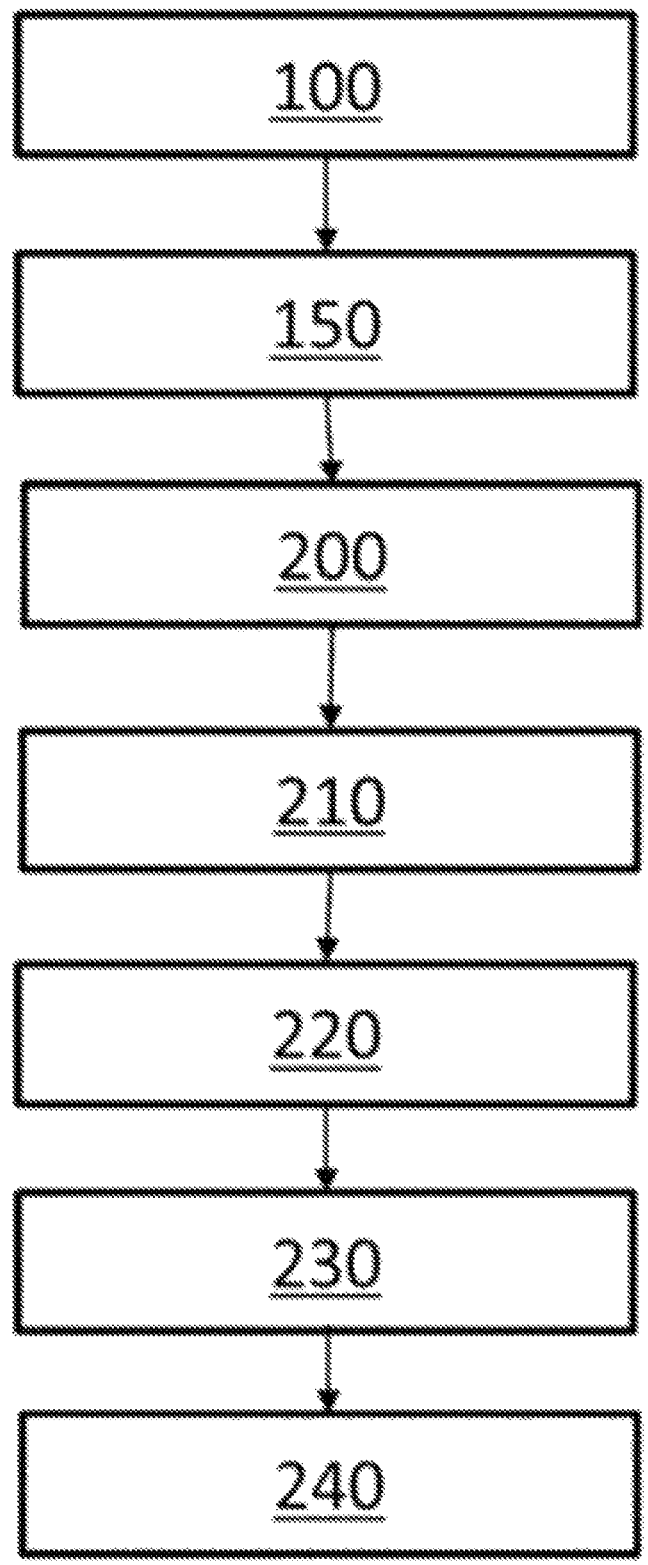
FIG. 4 schematically shows the main steps of the method according to one embodiment of the invention.

With reference to FIG. 4, the method for determining at least one pitch angle of the trailer relative to the towing vehicle, implemented by the system 1, will now be described.

The method comprises a step 100 of the camera 12 acquiring an image of the trailer in which lines of the trailer parallel to, the direction of the trailer appear. The image is then transmitted to the controller which implements the following steps.

Advantageously, but optionally, the controller implements a step 150 of correcting the distortion in the image due to the lens of the camera, which makes it possible to correct straight lines which may appear curved in certain portions of the image.

In a step 200, the controller implements a line-detection algorithm on the image in order to detect the salient edges of the trailer in the image. This step may be implemented by using, for example, an algorithm described by J. Canny et al, in "A computational approach to edge detection", *IEEE Trans, Pattern Anal. Mach. Intell.*, vol. PAMI-8 bi. 6, pp. 679-698, bov. 1986, incorporated herein by reference.

In a step 210, the controller selects the vanishing lines of the image, that is to say lines converging toward a vanishing point V in order to determine the position in the image of the vanishing point V at the intersection of the vanishing lines. Given the location of the camera, the vanishing lines correspond to the lines of the trailer which are parallel to the axis of the trailer. In FIG. 2, the lines which, among all of the lines detected in step 200, are vanishing lines corresponding to lines parallel to the axis of the trailer, are identified by the letter F. This step may be implemented in a manner known to those skilled in the art. Reference may be made, for example, to the publication by F. Tsai et al., "Detection of Vanishing Points Using Hough Transform for Single View 3D Reconstruction", in 34th Asian Conference on Remote Sensing 2013; ACRS 2013, incorporated herein by reference. The coordinates in the reference frame of the image of the vanishing point V are denoted $(v_i, v_j)$, where $v_i$ is the horizontal coordinate and $v_j$ is the vertical coordinate.

Returning to FIG. 1, the mathematical conventions adopted hereinafter will now be described. FIG. 1 is a top-view representation of a vehicle comprising a towing vehicle 21 and a trailer 20. A first reference frame (C) linked to the towing vehicle and centered on the point C which corresponds to the position of the camera is defined. The axis Cz of this reference frame is parallel to the optical axis of the camera, the axes Cx and Cy are perpendicular thereto, Cx being included in the plane of the representation of FIG. 1, and corresponding to a substantially horizontal axis, and Cy being perpendicular to Cx, and corresponding to a substantially vertical axis when the towing vehicle is on a horizontal road.

A second reference frame (H) is linked to the trailer and centered on the point H which corresponds to the anchor point of the trailer to the towing vehicle. The axis Hz of this reference frame is parallel to the direction D of the trailer, and the axes Hx and Hy are perpendicular thereto. Hx is included in the plane of FIG. 1 and Hy also corresponds to a vertical axis.

α denotes the yaw angle of the trailer relative to the towing vehicle, which corresponds to an angle of rotation about the y-axis. Additionally, β denotes the pitch angle about the x-axis and θ denotes the roll angle about the z-axis.

The coordinates, in the reference frame linked to the trailer, of the vanishing point V of the vanishing lines in the image of the trailer are (0, 0, Z∞).

In a step 220, the controller is then configured to determine the pitch angle from the coordinates $(v_i, v_j)$ of the vanishing point V, in a two-dimensional reference frame (not shown) of the image taken by the camera, where the first coordinate is horizontal, the second coordinate is vertical, and the origin of the reference frame is located at the optical center of the camera.

R and T respectively denote the rotation and translation matrices for expressing the coordinates of a point P of the reference frame (H) linked to the trailer in the reference frame (C) linked to the towing vehicle, as follows:

$$P = \begin{pmatrix} x_c \\ y_c \\ z_c \end{pmatrix} = R * \begin{pmatrix} x_H \\ y_H \\ z_H \end{pmatrix} + T$$

Where $x_c, y_c, z_c$ are the coordinates of P in the reference frame (C) and $x_H, y_H, z_H$ are the coordinates of P in the reference frame (H).

The rotation matrix R decomposes into three rotation matrices Rx, Ry and Rz corresponding to the rotation matrices of the angles β, α, and θ, respectively.

$$R_z = \begin{pmatrix} \cos(\theta) & -\sin(\theta) & 0 \\ \sin(\theta) & \cos(\theta) & 0 \\ 0 & 0 & 1 \end{pmatrix}$$

$$R_y = \begin{pmatrix} \cos(\alpha) & 0 & \sin(\alpha) \\ 0 & 1 & 0 \\ -\sin(\alpha) & 0 & \cos(\alpha) \end{pmatrix}$$

$$R_x = \begin{pmatrix} 1 & 0 & 0 \\ 0 & \cos(\beta) & -\sin(\beta) \\ 0 & \sin(\beta) & \cos(\beta) \end{pmatrix}$$

With $R = R_x * R_y * R_z$.

The coordinates $(v_i, v_j)$ of the vanishing point V in the reference frame of the image taken by the camera correspond to coordinates $(x_{c,v}, y_{c,v}, z_{c,v})$ of this point in the reference frame (C) of the camera, where $v_i = x_{c,v}/z_{c,v}$, $v_j = y_{c,v}/z_{c,v}$.

The following relationship therefore applies:

$$\begin{pmatrix} x_{c,v} \\ y_{c,v} \\ z_{c,v} \end{pmatrix} =$$

$$R * \begin{pmatrix} 0 \\ 0 \\ Z\infty \end{pmatrix} + T = Rx * Ry * Rz * \begin{pmatrix} 0 \\ 0 \\ Z\infty \end{pmatrix} + T = \begin{pmatrix} 1 & 0 & 0 \\ 0 & \cos(\beta) & -\sin(\beta) \\ 0 & \sin(\beta) & \cos(\beta) \end{pmatrix} *$$

$$\begin{pmatrix} \cos(\alpha) & 0 & \sin(\alpha) \\ 0 & 1 & 0 \\ -\sin(\alpha) & 0 & \cos(\alpha) \end{pmatrix} * \begin{pmatrix} \cos(\theta) & -\sin(\theta) & 0 \\ \sin(\theta) & \cos(\theta) & 0 \\ 0 & 0 & 1 \end{pmatrix} * \begin{pmatrix} 0 \\ 0 \\ Z\infty \end{pmatrix} + T =$$

$$\begin{pmatrix} 1 & 0 & 0 \\ 0 & \cos(\beta) & -\sin(\beta) \\ 0 & \sin(\beta) & \cos(\beta) \end{pmatrix} * \begin{pmatrix} \cos(\alpha) & 0 & \sin(\alpha) \\ 0 & 1 & 0 \\ -\sin(\alpha) & 0 & \cos(\alpha) \end{pmatrix} * \begin{pmatrix} 0 \\ 0 \\ Z\infty \end{pmatrix} + T =$$

$$\begin{pmatrix} 1 & 0 & 0 \\ 0 & \cos(\beta) & -\sin(\beta) \\ 0 & \sin(\beta) & \cos(\beta) \end{pmatrix} * \begin{pmatrix} \sin(\alpha)*Z\infty \\ 0 \\ \cos(\alpha)*Z\infty \end{pmatrix} + T = \begin{pmatrix} \sin(\alpha)*Z\infty \\ -\sin(\beta)*\cos(\alpha)*Z\infty \\ \cos(\beta)*\cos(\alpha)*Z\infty \end{pmatrix} + T$$

The translation T may be ignored with respect to the terms of the matrix when Z∞ tends to infinity, which is the case with the vanishing point.

The following relationship is then obtained:

$$v_i = \frac{x_{c,v}}{z_{c,v}} = \frac{\sin(\alpha)*Z\infty}{\cos(\beta)*\cos(\alpha)*Z\infty} = \frac{\tan(\alpha)}{\cos(\beta)}$$

$$v_j = \frac{y_{c,v}}{z_{c,v}} = -\tan(\beta)$$

In step 220, the computer therefore determines the pitch β of the trailer from the position of the vanishing point in the image taken by the camera, by:

β = atan $(-v_j)$

Advantageously, but optionally, the computer may also determine, in a step 230, the yaw α of the trailer from the pitch and the position of the vanishing point in the reference frame of the image taken by the camera, by:

α = atan $(v_i * \cos(\beta))$

In one embodiment, the system 1 is also configured to be able to additionally determine a roll angle of the trailer relative to the towing vehicle.

For this, the camera 12 must be positioned relative to the trailer such that, in an image acquired by the camera, lines perpendicular to the axis of the trailer and corresponding, when the trailer is on a horizontal plane, to vertical lines are also visible. This may be obtained, for example, by means of vertical edges located on the front face of the trailer, with a camera having a large opening angle.

In this case, the controller may repeat step 210 in order to select the vanishing lines in the image corresponding to the vertical lines of the trailer, and deduce therefrom the position in the reference frame of the image of the vanishing point W corresponding to the intersection of these vanishing lines. It is not necessary for the vanishing point W to be in the image, Le, within the boundaries of the image, its coordinates in the reference frame of the image may be determined from the vanishing lines even if these coordinates go beyond the coordinates of the edges of the image. This is also applicable, although less common, to the vanishing point V. Alternatively, the implementation of step 210 to determine the position of the vanishing point W may be carried out in the same step 210 in which the controller determines the position in the reference frame of the image of the vanishing point V. The controller may then determine, in a step 240, the roll θ of the trailer from the position ($w_i$, $w_j$), in the reference frame of the image acquired by the camera, of the vanishing point W.

Specifically, using the same notation as above, it may be considered that the vanishing point W has, in the reference frame of the trailer, coordinates (X∞, 0, 0); the Y- and Z-positions of this point are arbitrary and may be reduced to 0, The following relationship then obtained:

$$\begin{pmatrix} x_{c,w} \\ y_{c,w} \\ z_{c,w} \end{pmatrix} =$$

$$R * \begin{pmatrix} X\infty \\ 0 \\ 0 \end{pmatrix} + T = Rx * Ry * Rz * \begin{pmatrix} X\infty \\ 0 \\ 0 \end{pmatrix} + T = Rx * Ry * \begin{pmatrix} \cos(\theta) * HX\infty \\ \sin(\theta) * HX\infty \\ 0 \end{pmatrix} + T$$

Where $x_{c,w}$, $y_{c,w}$, and $z_{c,w}$ are the coordinates, in the reference frame (C) of the towing vehicle, of the vanishing point W, with $w_i = x_{c,w}/z_{c,w}$ and $w_j = y_{c,w}/z_{c,w}$.

As before, the translation T may be ignored, and the following relationship is obtained:

$$w_i = \frac{Rxy11 * \cos(\theta) * X\infty + Rxy12 * \sin(\theta) * X\infty}{Rxy31 * \cos(\theta) * X\infty + Rxy32 * \sin(\theta) * X\infty} = \frac{Rxy11 + Rxy12 * \tan(\theta)}{Rxy31 + Rxy32 * \tan(\theta)}$$

where denotes the term of the $i^{th}$ row and $j^{th}$ column of the matrix $R_{xy} = R_x * R_y$. These terms are known once the pitch angle β and yaw angle α have been determined. The roll angle θ is therefore obtained by:

$$\theta = \text{Arctan}\left(\frac{-Rxy11 + w_i * Rxy31}{Rxy12 - w_i * Rxy32}\right)$$

By virtue of the above relationships, it may be noted that the various angles may be determined solely from an image of the trailer acquired by the camera, without requiring any calibration or any movement of the trailer in order to define a reference position.

The invention claimed is:

1. A system for determining at least one pitch angle of a trailer relative to a towing vehicle to which the trailer is attached, the system comprising a camera mounted on the towing vehicle and capable of acquiring images of the trailer in which lines of the trailer parallel to a longitudinal axis of the trailer are visible to the camera, and a computer, in which the computer is configured to implement the following steps:
   implementing a line-detection algorithm on at least one image of the trailer acquired by the camera,
   detecting in the image lines of the trailer parallel to the longitudinal axis of the trailer, corresponding to vanishing lines, and deducing from the vanishing lines a position of a vanishing point V at a convergence of the vanishing lines, and
   from the position of the vanishing point V, determining at least one pitch angle of the trailer relative to the towing vehicle.

2. The system as claimed in claim 1, in which,
   a first reference frame is associated with the trailer, centered on an anchor point of the trailer to the towing vehicle, the first reference frame comprising two first axes perpendicular to a direction of the trailer and a third axis parallel to the direction of the trailer and extending theretoward,
   a second reference frame is associated with the towing vehicle, centered on the camera,
   a third reference frame is a two-dimensional reference frame of the image acquired by the camera, centered on an optical center of the camera, and
   coordinates of the vanishing point V of the trailer in the first reference frame associated with the trailer are (0, 0, Z∞), and in the third reference frame are ($v_i$, $v_j$), where $v_i$ is a horizontal coordinate and $v_j$ is a vertical coordinate,
   and the computer is configured to determine a pitch angle β of the trailer relative to the towing vehicle from the vertical coordinate $v_j$ of the vanishing point V of the trailer in the third reference frame by:

β=atan ($-v_j$).

3. The system as claimed in claim 2, wherein the computer is further configured to determine a yaw angle α of the trailer relative to the towing vehicle from the horizontal coordinate $v_i$ of the vanishing point V of the trailer in the third reference frame of the image by:

α=atan ($v_i$ cos β).

4. The system as claimed in claim 3, wherein the camera is further capable of acquiring images of the trailer in which vertical edges located on the front face of the trailer are visible to the camera, and wherein the computer is further configured to determine a roll axis of the trailer relative to the towing vehicle from:
   yaw and pitch angles of the trailer, and
   the position in the reference frame of an image taken by the camera of a further vanishing point W where the vanishing lines corresponding to the vertical edges of the trailer converge.

5. The system as claimed in claim 4, in which the coordinates of the vanishing point W of the trailer in the first reference frame associated with the trailer are (X∞, 0, 0), and in the third reference frame of an image taken by the camera are ($w_i$, $w_j$), and the computer is configured to calculate a roll angle θ from a horizontal coordinate $w_i$, of the vanishing point W by:

$$\theta = \text{atan}\left(\frac{\cos\alpha + w_i \sin\alpha \cos\beta}{w_i \sin\beta}\right).$$

6. A method for determining at least one pitch angle of a trailer relative to a towing vehicle to which the trailer is attached, the method being implemented by a system comprising a camera mounted on the towing vehicle and a computer and comprising:
   the camera acquiring an image of the trailer in which lines of the trailer parallel to a longitudinal axis of the trailer are visible to the camera,
   implementing a line-detection algorithm to detect the lines of the trailer parallel to the longitudinal axis of the trailer, corresponding to vanishing lines of the image,
   detecting a position of a vanishing point of the trailer at the convergence of the vanishing lines, and
   from the position of the vanishing point, determining at least one pitch angle of the trailer relative to the towing vehicle.

7. The method as claimed in claim 6, further comprising determining, from the pitch angle and coordinates of the vanishing point, a yaw angle of the trailer relative to the towing vehicle.

8. A non-transitory computer program product, comprising code instructions for implementing a method comprising:

- implementing a line-detection algorithm on at least one image of a trailer in which lines of the trailer parallel to a longitudinal axis of the trailer are visible to a camera mounted on a vehicle towing the trailer,
- detecting vanishing lines of the image and deducing a position of a vanishing point of the trailer from the vanishing lines, and
- from the position of the vanishing point, determining at least one pitch angle of the trailer relative to the towing vehicle, when it is executed by a computer.

\* \* \* \* \*